(12) United States Patent
Chen

(10) Patent No.: US 6,391,244 B1
(45) Date of Patent: May 21, 2002

(54) AIR-POWERED EJECTION SYSTEM FOR PREFORM TAKE OUT PLATE ASSEMBLY

(75) Inventor: Jincheng Chen, Lee's Summit, MO (US)

(73) Assignee: R & D Tool & Engineering, Co., Lee's Summit, MO (US)

( * ) Notice: Subject to any disclaimer, the term of this patent is extended or adjusted under 35 U.S.C. 154(b) by 0 days.

(21) Appl. No.: 09/543,311

(22) Filed: Apr. 5, 2000

(51) Int. Cl.[7] .............................................. B29C 49/64
(52) U.S. Cl. ........................ 264/336; 264/348; 425/526; 425/533; 425/534
(58) Field of Search ............................. 264/348, 328.14, 264/334, 335, 336, 537, 538; 425/534, 533, 537, 556, 437, 526

(56) References Cited

U.S. PATENT DOCUMENTS

| | | | |
|---|---|---|---|
| RE33,237 E | | 6/1990 | Delfer, III |
| 4,950,152 A | * | 8/1990 | Brun et al. .................. 264/537 |
| 5,114,327 A | | 5/1992 | Williamson et al. |
| 5,447,426 A | | 9/1995 | Gessner et al. |
| 5,702,734 A | * | 12/1997 | Hartman et al. ............. 264/237 |
| 5,707,662 A | * | 1/1998 | Bright et al. ................ 425/533 |
| 6,171,541 B1 | * | 1/2001 | Neter et al. ............. 264/328.14 |
| 6,315,543 B1 | * | 11/2001 | Lausenhammer et al. ... 264/334 |

FOREIGN PATENT DOCUMENTS

| WO | WO 0029193 | 5/2000 |
|---|---|---|

\* cited by examiner

*Primary Examiner*—Jill L. Heitbrink
(74) *Attorney, Agent, or Firm*—Hovey Williams LLP

(57) ABSTRACT

The take-out device for use with a machine for injection molding plastic articles such as PET preforms has a plurality of cooling tubes that receive hot preforms from the molding machine, carry them to a position remote from the molds of the machine for cooling, and then eject the cooled preforms onto a conveyor or other handling apparatus. The preforms are retained within the cooling tubes by vacuum pressure, but are then ejected by positive air pressure. A retaining plate spaced slightly outwardly beyond the outer ends of the cooling tubes is shiftable into a closed position in which it momentarily blocks ejection of the preforms during the application positive air pressure, yet allows them to be dislodged slightly axially outwardly from the tubes. Such slight dislodging movement is inadequate to vent the air system to atmosphere such that sufficient dislodging air pressure remains in tubes where the preforms might otherwise tend to stick and resist ejection. After the momentary delay, the plate is shifted to an open position in which all of the dislodged preforms are freed to be pushed out of the tubes by the air pressure. Preferably, the retaining plate is provided with specially shaped holes having pass-through portions that become aligned with the tubes when the plate is in its open position, and smaller diameter blocking portions that become aligned with the tubes when the plate is in its closed position. The smaller diameter blocking portions exceed the diameter of the neck of the preforms but are smaller in diameter than the flanges of the preforms such that surface areas around the blocking portions overlie the flanges to block ejection of the preforms as they undergo their dislodging movement.

11 Claims, 4 Drawing Sheets

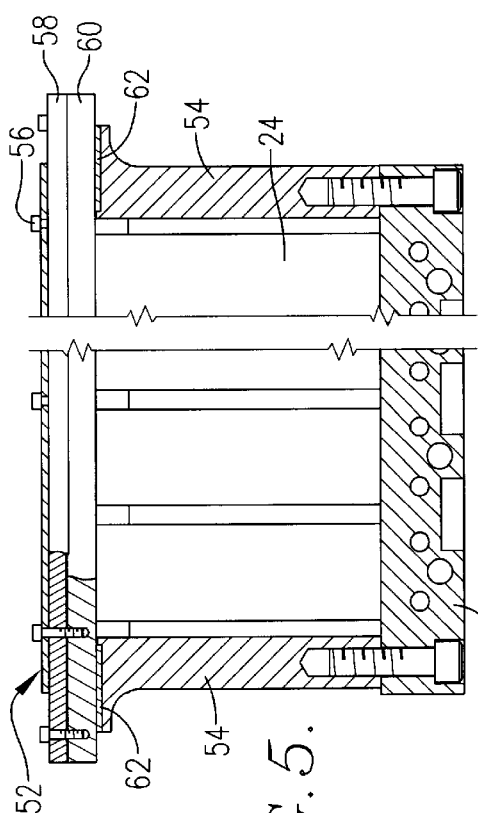
FIG. 4.
FIG. 5.
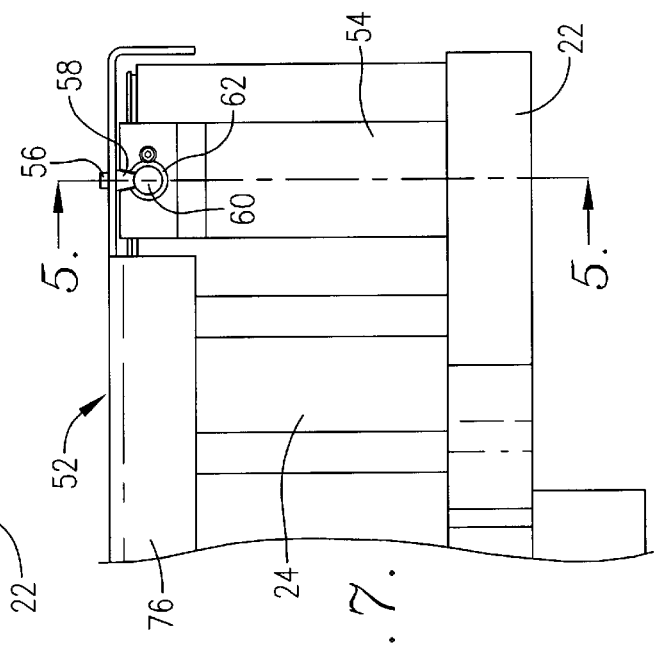
FIG. 7.
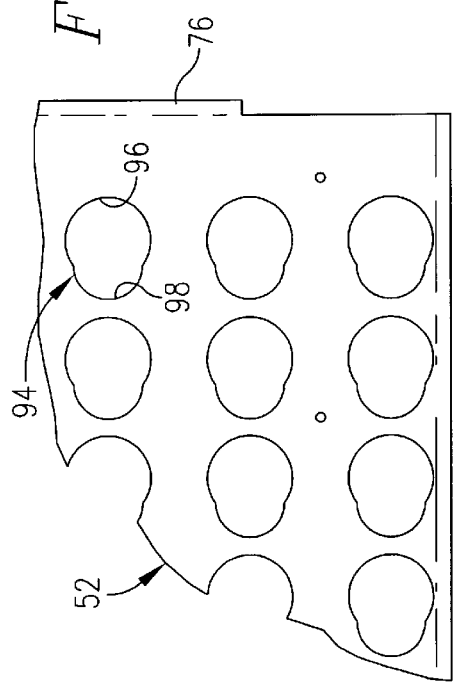
FIG. 6.
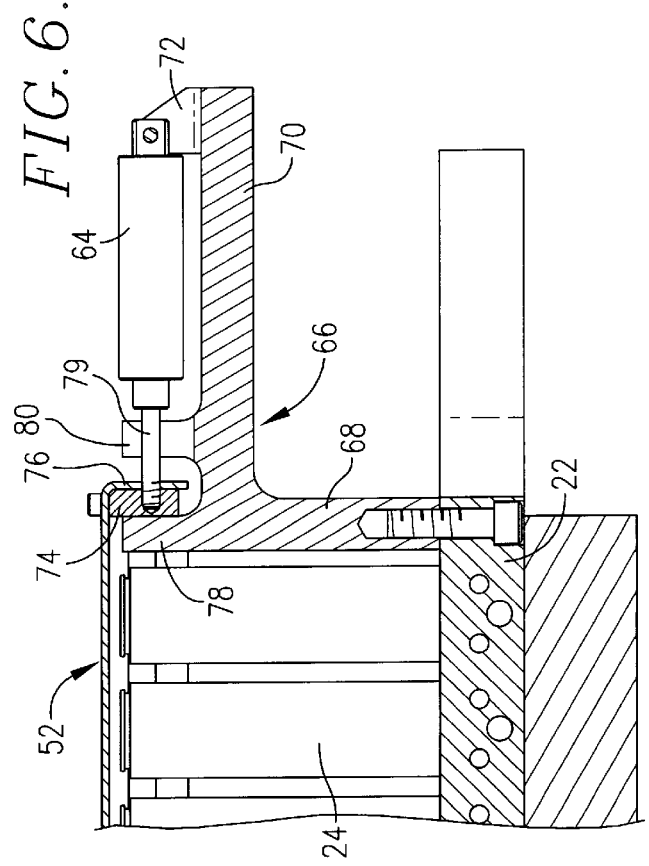

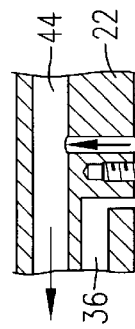
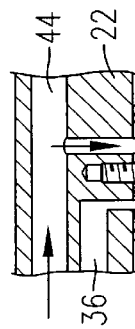
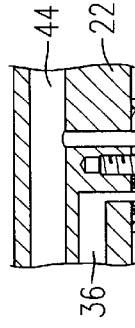
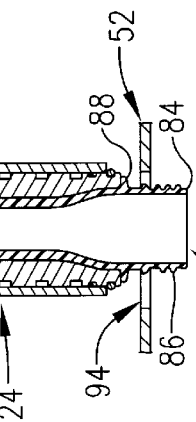
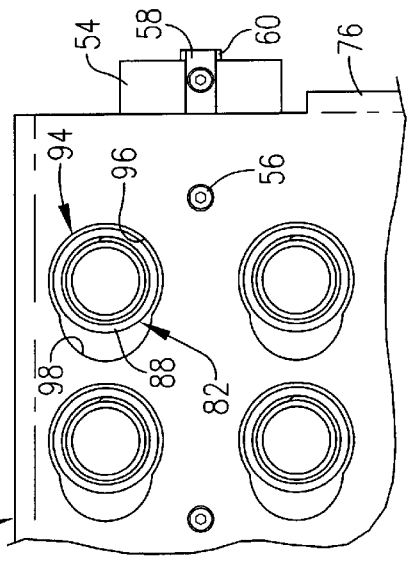
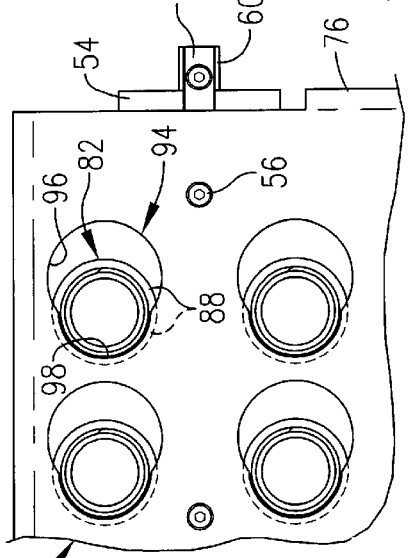
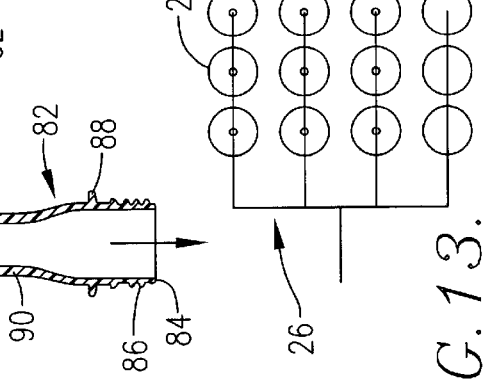

AIR-POWERED EJECTION SYSTEM FOR PREFORM TAKE OUT PLATE ASSEMBLY

TECHNICAL FIELD

The present invention relates to the field of injection molding machines and, more particularly, to improvements in a take-out device for removing hot molded articles, such as preforms, from the molds, cooling them, and then discharging the cooled articles onto a conveyor or other handling equipment. The present invention is particularly concerned with an improved way of ejecting the cooled articles from the take-out device by pneumatic pressure.

BACKGROUND

Robotic take-out devices for removing hot molded plastic articles such as PET preforms from molds when the molding machine is in a mold-open position and then cooling the preforms while they are carried to a take-out conveyor are well known in the art. An example of one such apparatus is disclosed in U.S. Pat. No. Re. 33,237. The take-out device disclosed in the '237 patent relies upon a positive pressure air system to eject the preforms from the device after they have been cooled. One problem with a system of that type, however, is that certain of the cooled preforms may stick in their cooling tubes while others may freely eject. Once some of the preforms have ejected, there may be insufficient air pressure at the sticking preforms to dislodge them from their tube because the air system is effectively vented to atmosphere at the numerous empty tubes.

One way to avoid the venting problem is to provide positive mechanical ejection of the preforms. See, for example, U.S. Pat. No. 5,447,426 disclosing the use of mechanical ejector bars that, when operated, engage the undersides of neck flanges on the preforms and pull the preforms out of the cooling tubes. Other types of mechanical ejector mechanisms are also well-known in the art. However, the known mechanical ejector mechanisms are generally more complex than air ejector systems and have the disadvantage of increasing the number of operating components involved, which necessarily increases costs and raises issues of mechanical reliability.

SUMMARY OF THE INVENTION

The present invention solves the sticking problem while providing a simple alternative to known mechanical ejectors. Instead of mechanical ejection, the present invention contemplates a return to pneumatic ejection but incorporates the additional feature of momentarily retaining all of the cooled preforms within their tubes by blocking their escape until they have been slightly dislodged by the initial application of positive pressure air. By keeping the preforms essentially in place until all have been dislodged, no significant venting to atmosphere takes place such that adequate air pressure is assured in those tubes where sticking might otherwise be a problem. Once dislodged, removal of the retaining structure allows the preforms to be blown out of the tubes by the air pressure.

In its preferred form, the present invention contemplates the use of a shiftable retainer plate that overlies the open ends of the cooling tubes. The plate is provided with a plurality of holes that are strategically located to be aligned or disaligned with the open ends of the cooling tubes, depending upon the position of the plate. In a closed position of the plate, enlarged pass-through portions of the holes are registered with the tubes so as to permit hot preforms to be received within the tubes from the molds of the molding machine. The plate is spaced slightly outwardly from the open ends of the tubes so that when the cooling preforms are within the tubes, the annular flanges on the preforms reside in the space between the tube and the plate while the necks of the preforms project out through the holes. When the plate is then shifted to its closed position, a smaller size blocking portion of each hole moves into embracing relationship with the neck while solid surfaces of the plate come into overlying relationship with the flanges of the preforms.

With the plate thus in its closed position, the introduction of pressurized air into the inner ends of the tubes causes the preforms to pop-out slightly in a dislodging motion until the flanges butt up against the plate. If any one or more of the preforms tend to stick in their tube, the fact that all of the preforms are still in their tubes, even though some are partially dislodged, means that no substantial venting to atmosphere occurs. Consequently, adequate air pressure is assured in the sticking tubes to dislodge even those preforms. After a momentary period of delay for dislodgement, the plate is shifted to its open position allowing the dislodged preforms to be ejected from the tubes by the air pressure.

BRIEF DESCRIPTION OF THE DRAWINGS

FIG. 4 is an enlarged, fragmentary plan view of the retaining plate illustrating details of construction of the holes in the plate;

FIG. 5 is a transverse cross-sectional view through the carrier assembly taken substantially along line 5—5 of FIG. 7 and illustrating details of construction;

FIG. 6 is a fragmentary, transverse cross-sectional view of the carrier assembly illustrating the manner in which the air cylinder is operably coupled with the retaining plate for shifting the plate between its open and closed positions;

FIG. 7 is a fragmentary elevational view at one corner of the carrier assembly illustrating the manner in which the retaining plate is shiftably attached to the frame of the carrier assembly;

FIG. 8 is a fragmentary plan view of the carrier assembly and preforms illustrating the retaining plate in its open position;

FIG. 9 is a fragmentary longitudinal cross-sectional view of one of the cooling tubes with the retaining plate in its open position and a preform received within the tube;

FIG. 10 is a fragmentary plan view of the carrier assembly and preforms similar to FIG. 8 but showing the retaining plate in its closed position;

FIG. 11 is a fragmentary longitudinal cross-section view of one of the cooling tubes illustrating the retaining plate in its closed position and the preform pushed out by air pressure into a dislodged condition in which the flange of the preform is butted up against the retaining plate;

FIG. 12 is a longitudinal cross-sectional view of one of the cooling tubes with the retaining plate in its open position and the preform being ejected from the cooling tube; and FIG. 13 is a schematic diagram of the air/vacuum circuit and cooling tubes of the carrier assembly.

DETAILED DESCRIPTION

As the present invention may be embodied in many different forms, a preferred embodiment is disclosed hereinafter for exemplary purposes only. Thus, the invention should not be construed as being limited to the particular embodiment shown and described herein.

Figure 1:
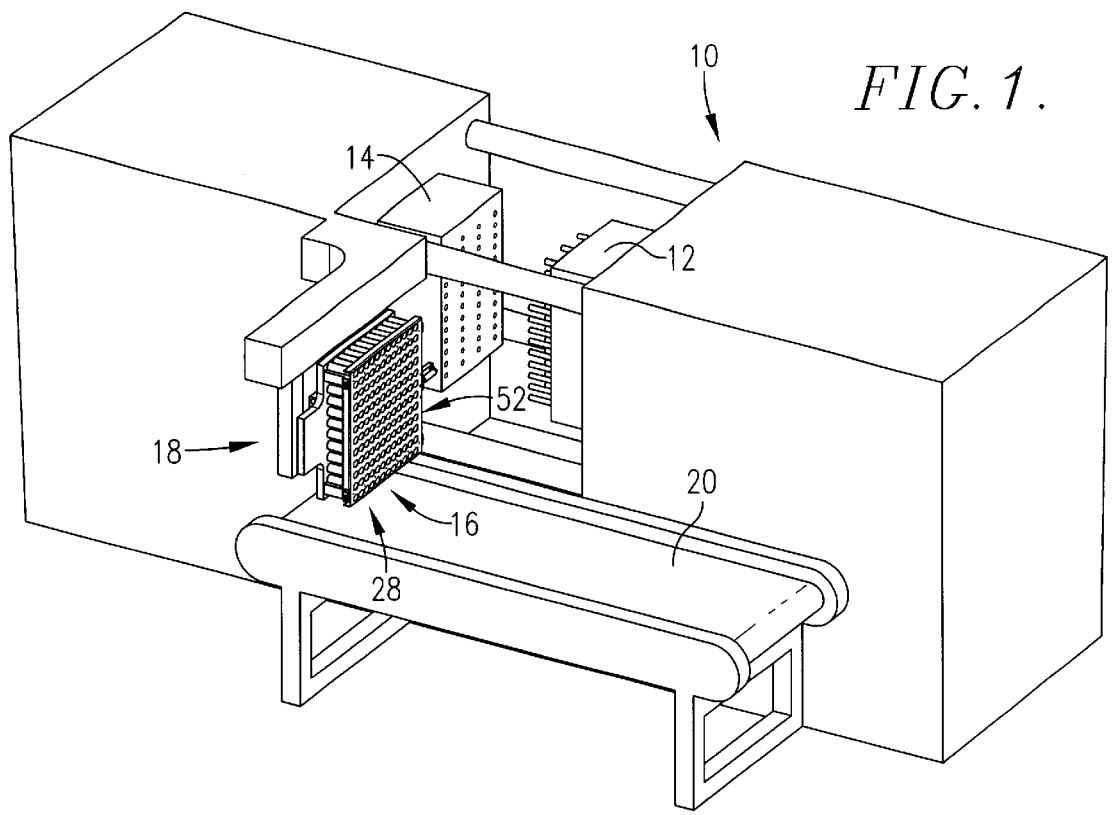
FIG. 1 is a schematic isometric view of a molding machine employing a take-out device with pneumatic preform ejection in accordance with the principles of the present invention.
Figure 2:
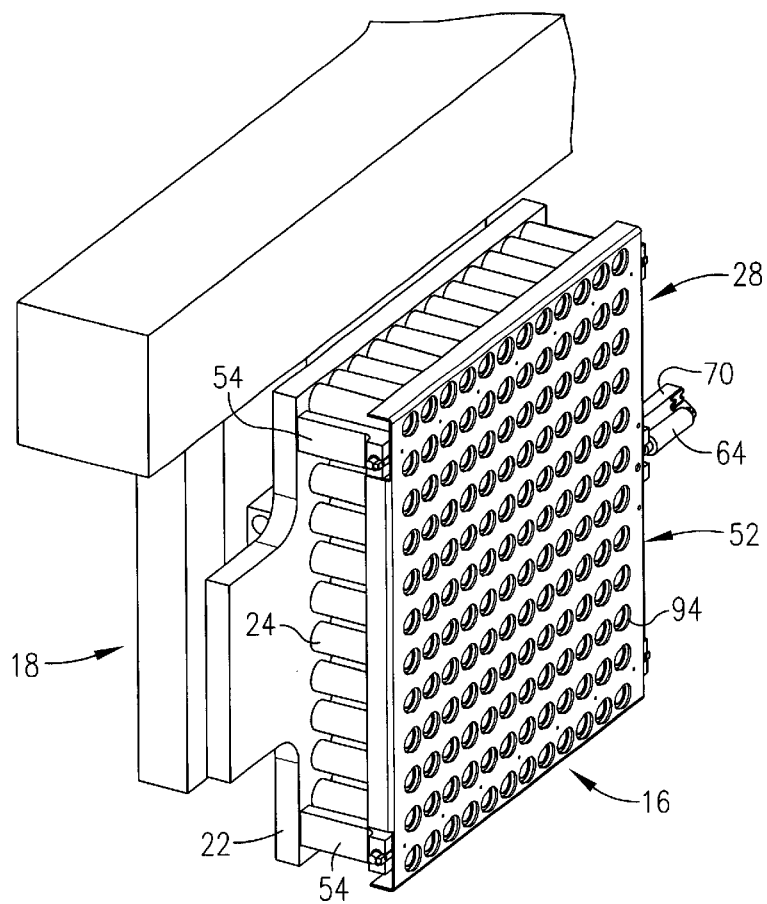
FIG. 2 is an enlarged, fragmentary isometric view of the take-out device of FIG. 1.

The molding machine 10 in FIG. 1 is illustrated in the mold open position in which the core half 12 of the mold and the cavity half 14 are spaced apart. In this condition, the carrier assembly 16 of a robotic take-out device broadly denoted by the numeral 18 can be shifted laterally into position between the separated mold halves. The carrier assembly 16 obtains the hot preforms or other articles from the core half 12 and then shifts back out from between the halves to a position overlying a conveyor 20 or the like. After the preforms have cooled in the carrier assembly 16, they are discharged onto the conveyor 20 for further handling.

Broadly speaking, the carrier assembly 16 includes a rear support plate 22; a plurality of cooling tubes 24 carried on the support plate and projecting outwardly therefrom; an air/vacuum circuit 26 (shown schematically in FIG. 13) communicating with the cooling tubes 24 for holding the preforms in the tubes during the cooling cycle and then pneumatically ejecting them from the tubes at the conclusion of the cooling cycle; and a retaining mechanism 28 for momentarily blocking ejection of the cooled preforms following activation of the air circuit 26. A cooling water circuit (partially shown in FIGS. 9, 11, and 12) may also be provided with the carrier assembly 16 for the purpose of lowering the temperature of the tubes 24 to assist in the cooling operation.

FIGS. 9, 11 and 12 show details of construction of the cooling tubes 24. As illustrated in those figures, each tube 24 includes an inner cylindrical component 30 and an outer housing 32 that surrounds the inner component 30. Helical passageways 34 between the component 30 and housing 32 may serve as water channels for cooling tube 24. An inlet line 36 communicating with passageways 34 supplies cooling water thereto, while an outlet line (not shown) returns warm water to the source of coolant.

Inner component 30 has a cavity 38 conforming generally with the shape of a preform to be received by tube 24. Tube 24 is secured to support plate 22 by a bolt 40 having a head that draws down against an insert 42 at the inner end of the cavity 38.

The air/vacuum circuit 26 includes a common passage 44 communicating with a number of the tubes 24, and a bore 46 connected between passage 44 and the cavity 38 at the inner end of the insert 42. Small longitudinal channels in the exterior of insert 42 communicate passage 44 with cavity 38. A cross slot 48 and axial channel 50 within the insert 42 facilitate installation and manipulation of bolt 40. It will be understood that circuit 26 serves not only as a means for supplying pressurized air to the tubes 24 for ejection purposes, but also as a means for drawing a vacuum or suction pressure on tubes 24 at certain times during the transporting and cooling cycle, e.g., when the take-out device receives preforms from the open mold, during transport therefrom to the conveyor 20, and during any pause for cooling time at that location.

In the preferred embodiment, the retaining mechanism 28 comprises as its primary component a retaining plate 52 that is shifted transversely of the tubes 24 between open and closed positions. Plate 52 is attached to the support plate 22 by four posts 54 located at the four corners of plate 52 and projecting outwardly from the face thereof. Two rows of screws 56 pass through a pair of stiffening bars 58 on the back side of plate 52. Screws 56 thread into corresponding long shafts 60 that span the width of the plate 52 and are slidably received at their opposite ends within in slide bushings 62 in the upper ends of a corresponding pair of the posts 54. The posts 54 thus support the plate 52 for transverse shifting movement between open and closed positions.

Figure 3:
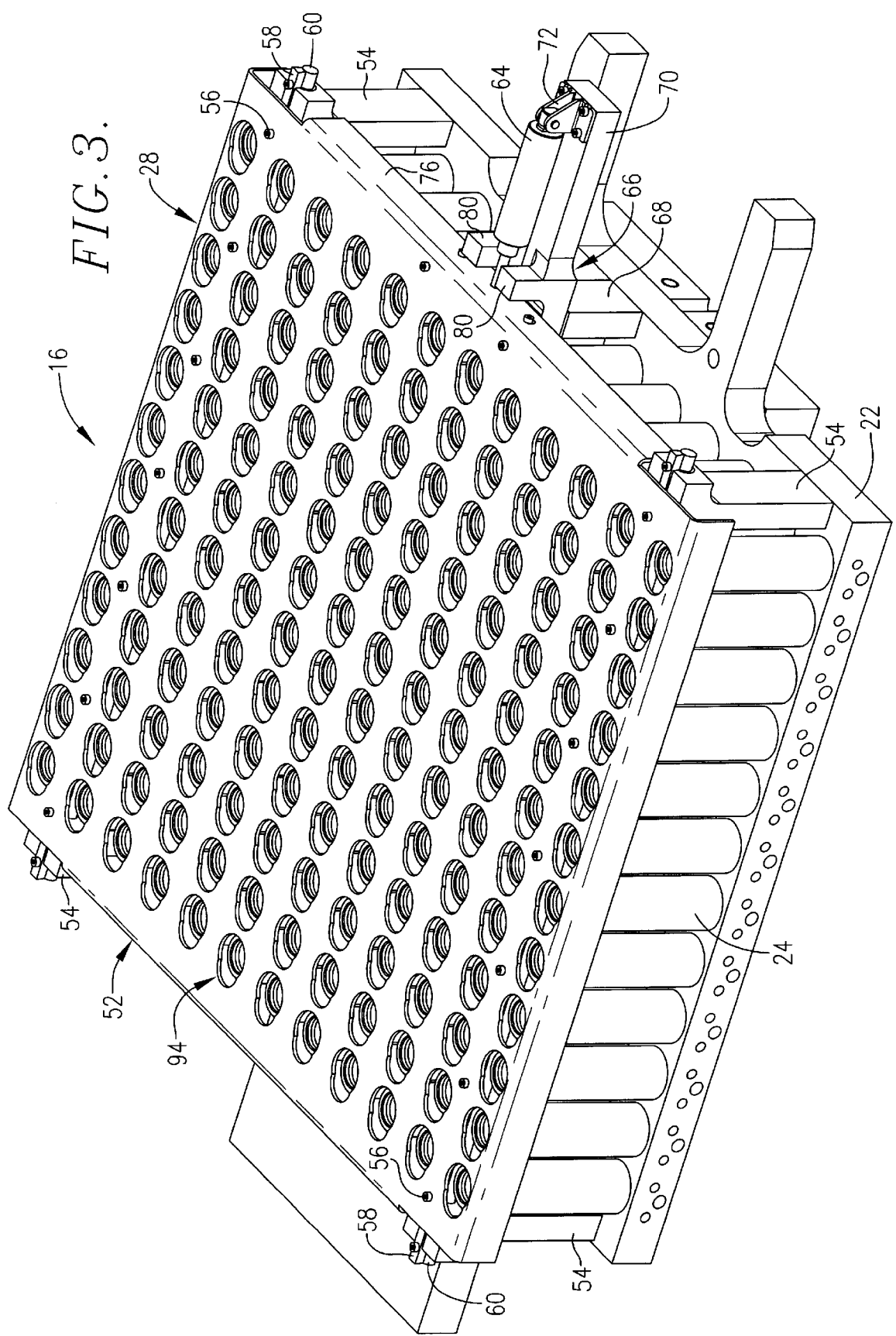
FIG. 3 is an enlarged isometric view of the carrier assembly of the take-out device illustrating the retaining plate in its open position.

Shifting of the plate 52 between its open and closed positions is effected by an operator in the form of an air cylinder 64 (see particularly FIGS. 3 and 6). Air cylinder 64 is supported by a right angle mount 66 having one leg 68 bolted to the support plate 22 and a second, integral leg 70 projecting outwardly from leg 68. The anchor end of cylinder 64 is pivotally secured to a mounting bracket 72 at the outer end of leg 70, while the rod end of cylinder 64 is secured by threading or a swivel coupling to a block 74 immediately behind a downturned lip 76 on the plate 52. The block 74 and lip 76 are located between a shoulder 78 on the leg 68 and a pair of transversely aligned shoulders 80 adjacent the inner end of the leg 70. Shoulder 78 thus serves as a limit stop to limit the extension of rod 79 of air cylinder 64, while shoulders 80 limit retraction of rod 79. Full extension of rod 79 to the extent permitted by shoulder 78 determines the open position of plate 52, while full retraction of rod 79 as determined by shoulders 80 defines the closed position for plate 52.

One example of a preform that can be handled by the present invention is illustrated in FIGS. 9, 11 and 12. The preform 82 shown in those figures presents an outermost annular edge 84, a threaded neck 86 extending inwardly from edge 84, an annular flange 88 spaced inwardly from edge 84 and larger in diameter than edge 84, and a main body portion 90 of reduced diameter relative to flange 88. When preform 82 is received within the cooling tube 24, the main body portion 90 is housed within cavity 38, while flange 88, neck 86 and edge 84 are disposed outside of cavity 38. When a vacuum or suction is drawn on cavity 38, the underside of flange 88 butts up against the outermost end 92 of tube 24.

Plate 52 is spaced a short distance outwardly beyond outer ends 92 of tubes 24. A plurality of holes 94 are formed within plate 52 corresponding in number to the tubes 24. Each hole 94 includes a circular pass-through portion 96 that is larger in diameter than flange 88 on the preforms being handled by carrier assembly 16. In addition, each hole 94 includes a blocking portion 98 that adjoins pass-through portion 96. Each blocking portion 98 has a center that is eccentric with respect to the center of the adjoining pass-through portion 96. Furthermore, each blocking portion 98 has a diameter that exceeds the diameter of neck 86 but is less than the diameter of flange 88. When plate 52 is in its open position as illustrated in FIG. 8, the pass-through portion 96 of each hole 94 is aligned with a corresponding cooling tube 24, while when plate 52 is in the closed position illustrated in FIG. 10, the blocking portion 98 of each hole 94 becomes aligned with the corresponding tube 24. When plate 52 is in the open position, a preform 82 can pass through the aligned pass-through portion 96 as illustrated in FIGS. 8 and 9, as well as FIG. 12. On the other hand, when plate 52 is in the closed position, portions of the back side surface of plate 52 around blocking portion 98 of each hole 94 overlie flange 88 of preform 82 and block ejection of the preform from the cooling tube as illustrated in FIGS. 10 and 11.

OPERATION

The preferred carrier assembly 16 illustrated throughout the figures has three times more cooling tubes 24 than the mold has cores. While carrier assembly 16 may be provided with cooling tubes equal in number to the cores and cavities, having three sets of tubes permits the take-out device 18 to carry three complete sets of preforms at any one time for cooling purposes. While one set of the tubes is being loaded with preforms from the core half 12, two other sets of the tubes can contain cooling preforms that have been previously received from the molding machine. Then, when the carrier assembly 16 is shifted back out to its unloading position overlying conveyor 20, the set of preforms which have resided the longest in the carrier assembly 16 can be ejected, while the other two remain in place for cooling. The carrier assembly 16 is then shifted back into loading position between the opened mold halves when the mold cycle has been completed for the purpose of loading the empty tubes with a new set of hot preforms. This multi-positioning concept is well-known in the art and is disclosed, for example, in U.S. Pat. No. Re. 33,237.

Assuming that carrier assembly 16 includes three sets of cooling tubes, it will be appreciated that a separate air circuit 26 is provided for each set. Thus, when one set of the preforms is ejected at the conveyor 20 by positive pressure air, the other two sets of preforms are held within their tubes by the suction pressure provided by their independent air/vacuum circuits. Consequently, even though plate 52 becomes shifted to its open position for ejection of the fully cooled set of preforms when carrier assembly 16 is at the conveyor 20, the still cooling preforms of the other two sets are not ejected at that time. They remain in place for further cooling until it is their turn to be ejected during a future return of the carrier assembly 16 to the conveyor 20.

As carrier assembly 16 moves into the appropriate position between the opened mold halves 12, 14, the vacuum cycle has already commenced within the particular circuit 26 that will be receiving hot preforms. As mentioned earlier, the vacuum is also on in the other circuits associated with the other sets of cooling tubes. Retaining plate 52 is in its open position at this time, aligning the pass-through portions 96 of all holes 94 with their corresponding cooling tubes 24. Thus, the hot preforms on the core rods of core half 12 are stripped off the rods by mechanism not shown but well understood by those skilled in the art and are inserted into the awaiting cooling tubes 24. The hot preforms are drawn into the cavities 38 of the cooling tubes 24 until such times as the flanges 88 on preforms 82 engage the outermost end 92 of each of the tubes, as illustrated in FIG. 9.

As carrier assembly 16 then shifts outwardly toward the conveyor 20, the vacuum cycle continues with respect to all cooling tubes. When carrier assembly reaches conveyor 20, swiveling mechanism (not shown) begins rotating the carrier assembly 90° from its FIG. 1 position to completely invert the cooling tubes. During such inversion, the retaining plate 52 is shifted by air cylinder 64 to its closed position of FIGS. 10 and 11. The control associated with machine 10 then switches the vacuum cycle to the pressure cycle in one of the circuits 26, i.e., the circuit for the set of preforms which have been cooled the longest, while the control maintains the vacuum cycle in the other two circuits.

The introduction of positive pressure air in the cooling tubes to be dumped causes the preforms held therein to pop-out in a slight axial dislodging movement until the flanges 88 engage the back side of the plate 52. Such movement is very small, on the order of 0.100 to 0.200 inches, such that there is very little opportunity for venting to the atmosphere to occur around the dislodged preforms. Accordingly, in the event any of the preforms tend to stick, there is adequate positive pressure in those particular tubes to continue pushing against their inner ends and cause them to be dislodged like the others.

After a very short delay, for example on the order of one-half second after activation of the positive pressure air, retaining plate 52 is shifted to its open position of FIG. 8, allowing the positive pressure air to eject the preforms through the pass through portions 96 of holes 94 as illustrated in FIG. 12 for gravitation onto conveyor 20. After the carrier assembly dumps the preforms, the vacuum cycle is starts up again in the empty tubes, and the take-out operation resumes when the mold halves 12 and 14 open.

As is apparent, many changes could be made in the preferred embodiment without departing from the broad concepts of the invention. For example, the structure used for retaining the preforms during dislodgement could take a variety of forms other than the perforated plate 52. Moreover, the holes in plate 52 need not necessarily be of the configuration illustrated herein. For example, a variety of polygonal shapes could work, as well as other configurations, so long as the preforms are permitted to leave the tubes when the retaining structure is in an open position and are blocked from such departure when it is in a closed position.

Furthermore, the retaining structure need not move in a transverse path of travel when moving between its opened and closed positions as does retaining plate 52, but instead could move toward and away from tubes 24 in an axial direction, or in a transverse swinging motion, for example. In addition, the blocking action need not occur between the flanges and the retaining plate or other blocking structure, although it is generally desirable to avoid contact with the outermost edge 84 of the preform.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of his invention as pertains to any apparatus not materially departing from but outside the literal scope of the invention as set out in the following claims.

What is claimed is:

1. In a method of handling hot molded articles produced on an injection molding machine, the improvement comprising:

receiving a plurality of hot articles into a plurality of cooling tubes;

cooling the hot articles while they are contained within the tubes;

ejecting the cooled articles from the tubes by applying pressurized air from a common source to the articles within the tubes; and while pressurized air is applied to the articles within the tubes, temporarily blocking movement of the articles out of the tubes for a predetermined delay period to dislodge the articles before they are subsequently ejected.

2. In a method of handling hot preforms produced on an injection molding machine, said preforms each having a longitudinal axis, an outer annular edge, a larger diameter annular flange spaced inwardly from said edge, and a main body of reduced diameter relative to said flange disposed inwardly from the flange, the improvement comprising:

receiving a plurality of hot preforms into a plurality of cooling tubes with the main body of each preform housed within its tube and the flange and outer edge disposed outside of the tube;

cooling the hot preforms while they are received within the tubes;

moving a surface into a blocking position spaced a short distance axially outwardly from each flange;

applying pressurized air from a common source to the preforms within the tubes to dislodge them axially outwardly until the flanges engage the blocking surface; and after a predetermined period of delay, moving the surface out of the blocking position to permit pressurized air to eject the dislodged preforms from the tubes.

3. In a method as claimed in claim 2, said surface being moved transversely of the preforms during said moving steps.

4. In a takeout device for transporting and cooling a hot molded article, the improvement comprising:

a plurality of holding tubes for receiving a plurality of articles to be cooled;

a positive pressure air circuit common to said plurality of tubes and operable when activated to supply pressurized air to the tubes in a direction to eject articles from the tubes; and retaining mechanism including structure outside the tubes operable to temporarily block the articles from ejecting from the tubes for a predetermined delay period following activation of said positive pressure air circuit.

5. In a takeout device as claimed in claim 4, said structure being operable to permit a small amount of dislodging movement of each article relative to its tube without leaving the tube during the delay period.

6. In a takeout device as claimed in claim 4, said structure including a plate having a plurality of clearance holes therein, said mechanism further including an operator coupled with said plate for shifting the plate between an open position in which the holes are axially aligned with the tubes and a closed position in which the holes are out of alignment with the tubes.

7. In a takeout device as claimed in claim 6, said plate being disposed when in said closed position to permit a small amount of dislodging movement of each article relative to its tube without leaving the tube during the delay period.

8. In a takeout device as claimed in claim 7, said articles each having an outermost, annular edge and a larger diameter annular flange spaced inwardly from said edge, said plate being disposed when in said closed position to block the article by engaging the exterior of said flange.

9. In a takeout device as claimed in claim 8, said plate being disposed when in said open position for the holes in the plate to clear the flanges of articles contained in the tubes.

10. In a takeout device as claimed in claim 6, said shifting of the plate between said open and closed positions being carried out in a direction transverse to the direction of ejecting movement of the articles.

11. In a takeout device for transporting and cooling hot preforms produced on an injection molding machine, said preforms each having a longitudinal axis, a neck provided with an outer annular edge, a larger diameter annular flange spaced inwardly from said edge, and a main body of reduced diameter relative to said flange disposed inwardly from the flange, the improvement comprising:

a plurality of holding tubes for receiving a plurality of preforms to be cooled, each of said tubes having an outermost end and said preforms being so disposed when received within the tubes that the body of the preform is housed within the tube while the flange, neck, and outermost edge of the preform are located outwardly beyond said outermost end of the tube;

a positive pressure air circuit common to said plurality of tubes and operable when activated to supply pressurized air to the tubes in a direction to eject the preforms axially from the tubes; and retaining mechanism operable to temporarily block the preforms from ejecting from the tubes for a predetermined delay period following activation of said positive pressure air circuit, said mechanism including a retaining plate spaced a short distance axially outwardly from said outermost end of the tubes and having a front that faces away from the tubes and a back that faces toward the tubes, said plate having a plurality of holes therein, each of said holes including a pass-through portion configured and sized to exceed the diameter of the flange of each preform, and an adjoining blocking portion configured and sized to exceed the diameter of the neck but not the flange of each preform, said mechanism further including an operator operable to shift said plate transversely of the tubes between an open position and a closed position, said plate being operable when in said open position to align said pass-through portions of the holes with the tubes to permit preforms to enter the tubes from the front of the plate until the flanges of the preforms are disposed behind the plate and the necks are projecting through the pass-through portions, said plate being operable when in said closed position to align said blocking portions of the holes with the tubes such that the necks project through the blocking portions, and the back of the plate adjacent the blocking portions overlies the flanges to block ejection of the preforms from the tubes as the preforms are dislodged axially from the tubes by positive pressure air during the delay period, said plate further being operable when in said open position to re-align the pass-through portions of the holes with the tubes to permit the preforms to be ejected from the tubes by positive pressure air following the delay period.

* * * * *